Sept. 8, 1953
W. A. WILLIAMS
2,651,209
ADJUSTABLE DIAMETER SHEAVE
Filed Nov. 16, 1950
2 Sheets-Sheet 1
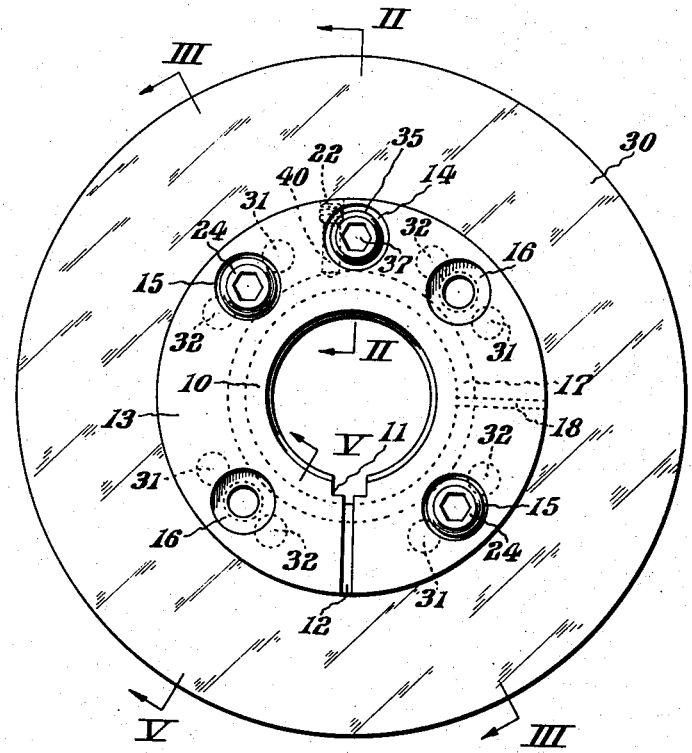
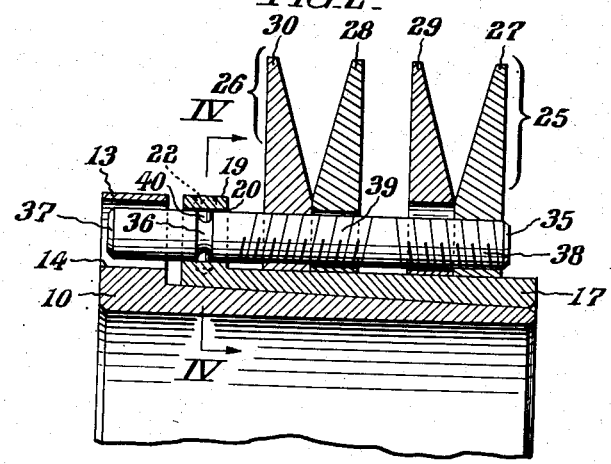
INVENTOR:
William A. Williams
BY Paul & Paul
ATTORNEYS.

Sept. 8, 1953 W. A. WILLIAMS 2,651,209
ADJUSTABLE DIAMETER SHEAVE
Filed Nov. 16, 1950 2 Sheets-Sheet 2
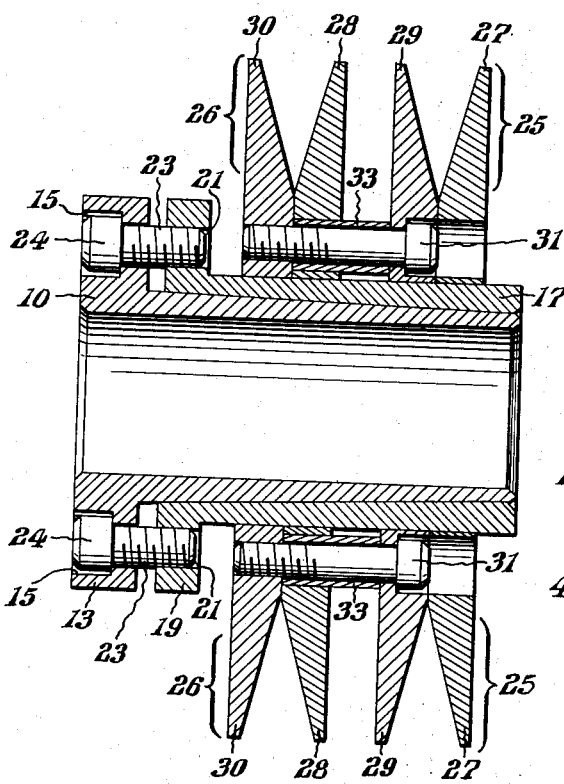
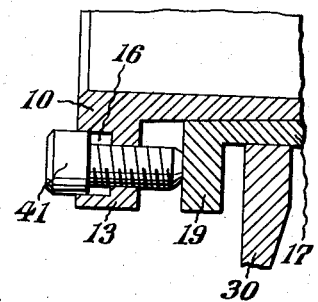
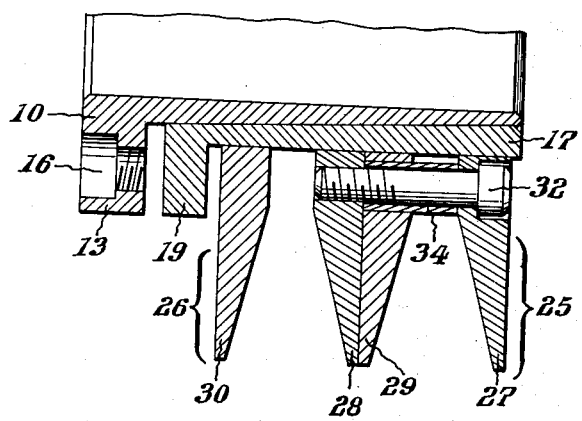
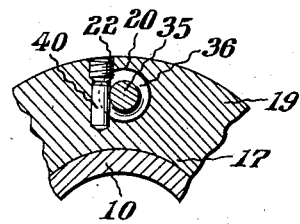
INVENTOR:
William A. Williams
BY Paul & Paul
ATTORNEYS.

Patented Sept. 8, 1953

2,651,209

UNITED STATES PATENT OFFICE 2,651,209

ADJUSTABLE DIAMETER SHEAVE

William A. Williams, Philadelphia, Pa., assignor to The American Pulley Company, Philadelphia, Pa., a corporation of Pennsylvania Application November 16, 1950, Serial No. 195,926

7 Claims. (Cl. 74—230.17)

This invention relates generally to adjustable diameter sheaves and more particularly relates to the adjustment and locking means for such sheaves.

It has long been an aim in the development of multiple groove adjustable diameter sheaves to provide a device having a maximum bore for a given hub outside diameter and at the same time to achieve a through bore construction so that the shaft can go all the way through the sheave when required.

The present invention, as its principal object, is directed toward a solution of this problem and provides a multiple groove adjustable diameter sheave having a maximum bore for a given hub outside diameter and at the same time providing a through bore construction so that the shaft can go all the way through the sheave when required.

Another object of this invention is to provide a form of adjustable diameter sheave which combines simplicity of construction with positive locking and easy adjustment uncomplicated by a freezing of parts.

Another object of this invention is to provide an adjustable diameter sheave which utilizes an exteriorly tapered split bushing and an interiorly tapered split hub positioned telescopically around the bushing, both bushing and hub having a flange formed on the corresponding ends thereof, which has means for clamping the hub and bushing in operative position, and which is provided with a pair of complementary flange units mounted on the hub with capacity for axial adjustment.

Still further objects and advantages of this invention will become apparent from the following detailed description of a preferred embodiment thereof, as illustrated in the accompanying drawings.

Fig. 1 of the drawings is an end elevation of a multiple groove adjustable diameter sheave illustrating a preferred embodiment of my invention.

Fig. 2 is a fragmentary longitudinal sectional view of the same taken as indicated by angled arrows II—II in Fig. 1 with the flanges closed.

Fig. 3 is a longitudinal sectional view of the same taken as indicated by angled arrows III—III in Fig. 1 with the flanges closed.

Fig. 4 is a fragmentary sectional view taken as indicated by angled arrows IV—IV in Fig. 2.

Fig. 5 is a fragmentary longitudinal sectional view taken as indicated by angled arrows V—V in Fig. 1 with the flanges opened.

Fig. 6 is a fragmentary sectional view taken as indicated by angled arrows V—V in Fig. 1 showing a jack bolt for urging the hub and bushing apart.

In describing the embodiment of my invention shown in the drawings, a specific terminology will be adopted for the purpose of clarity, but it is to be understood that it is not intended thereby to limit my invention to this detailed description of an illustrative embodiment thereof. Each term adopted is intended to include all equivalents thereof which operate in a substantially similar manner to accomplish a substantially similar result.

Referring more particularly to the drawings, the numeral 10 designates an exteriorly tapered bushing formed with an interior keyway 11 for keyed engagement with a shaft (not shown) and with a longitudinal extending split 12. The split 12 permits the bushing 10 to be compressed into gripping engagement with the shaft when the sheave is mounted thereon, thus avoiding looseness and resulting vibration. The bushing 10 likewise is rendered capable of expansion to permit the shaft to pass all the way through the sheave, if required. Bushing 10 is further formed with flange 13 having aperture 14, countersunk apertures 15 and countersunk threaded holes 16 therein.

Bushing 10 is slidably mounted within a hub 17 which is interiorly tapered to correspond with the exterior tapering of bushing 10. Hub 17 is formed with a longitudinal split 18 which renders the hub 17 capable of expansion and contraction. It will be clear from the above description that in the assembly of the sheave the hub 17 is under expansion and the bushing 10 is under compression and will positively grip the shaft. Hub 17 is further formed with flange 19 having aperture 20, threaded holes 21 and hole 22 therein. Hole 22 has its upper portion countersunk and threaded. See Fig. 4.

In order to force the hub 17 and bushing 10 in operative longitudinal movement toward each other, a pair of clamping bolts 23 are provided, the shanks of which are designed for threaded engagement with holes 21 in flange 19 of hub 17. The clamping bolts 23 are formed with allen heads 24 which are partially enclosed within the countersunk openings of apertures 15 and which abut against the inner face of said countersunk opening. See Fig. 3. When the allen headed clamping bolts 23 are tightened, the hub 17 and the bushing 10 will be drawn toward each other, resulting in the expansion of the hub 17 and the compression of the bushing 10 about the shaft.

It is clear that the loosening of allen headed clamping bolts 23 will not serve to disengage or release the hub 17 and bushing 10 and cause them to move away from each other and therefore a pair of jack bolts 41 are provided for this purpose. The jack bolts 41 are designed for threaded engagement with countersunk holes 16 in flange 13 of bushing 10 with their distal ends bearing against flange 19 of hub 17. See Fig. 6. The jack bolts 41 may be any bolt well known in the art, but it is suggested in the interest of interchangeability that exact duplications of allen headed clamping bolts 23 be utilized.

Complementary multiple flange units 25 and 26 are mounted upon hub 17. Flange unit 25 is composed of a plurality of similarly inclined flanges 27 and 28, and flange unit 26 is composed of a plurality of similarly inclined flanges 29 and 30. The flanges of unit 25 are oppositely inclined to the flanges of unit 26. It will be clear from Figs. 2, 3 and 5 of the drawings that the flange units 25 and 26 cooperate to form a plurality of adjustable flanges. In Figs. 2 and 3 the flanges are shown in the extreme closed position and in Fig. 5 the flanges are shown in the extreme open position. The component flanges of flange units 25 and 26 are held together in units by means of allen headed bolts 31 and 32. A plurality of tubular spacers 33, which are equally spaced circumferentially about the flanges, are utilized in a manner best shown in Fig. 3 to hold component flanges 29 and 30 a fixed distance apart upon tightening of allen headed bolts 31 and during adjustment of the flange units. Likewise, a plurality of tubular spacers 34, which are equally spaced circumferentially about the flanges, are utilized in a manner best shown in Fig. 5 to hold component flanges 27 and 28 a fixed distance apart upon tightening of allen headed bolts 32 and during adjustment of the flange units. The tubular spacers 33 and 34 are adapted to extend through holes in the respective intermediate flanges, as shown in Figs. 3 and 5.

Mounted in hub 17 for the purpose of adjusting the sheaves is adjusting screw 35 having the respective ends of its shank oppositely threaded, as shown in Fig. 2. Adjusting screw 35 is formed with groove 36 and allen head 37. Pin 40 having its upper portion threaded for threaded engagement with the countersunk opening of hole 22, is mounted in hole 22 and passed through groove 36 in adjusting screw 35 so as to fixedly position said screw axially with respect to hub 17. Threaded portion 38 of adjusting screw 35 is in threaded engagement with flange 27 and serves to transmit axial movement to flange unit 25. Oppositely threaded portion 39 of adjusting screw 35 is in threaded engagement with flange 30 and serves to transmit axial movement to flange unit 26 opposite to that transmitted to flange unit 25. It will be clear that upon any rotation of adjusting screw 35, the flange units 25 and 26 will always move in opposite directions to each other, thus rendering the sheaves readily adjustable to the desired diameter.

The operation of my invention is as follows: The flange units 25 and 26 are mounted on the shaft. The flanges are then adjusted to the desired position by turning adjusting screw 35 by means of a wrench. The allen headed clamping bolts 23 are then tightened causing the bushing 10 and hub 17 to be drawn toward each other, resulting in the compression of the bushing 10 in a gripping action about the shaft and the expansion of hub 17, thus fixing the flange units 25 and 26 tightly in place about the hub 17. It will be apparent from the foregoing description that all looseness in the assembled and operative sheave is eliminated together with the destructive vibration caused by such looseness. When it is desired to adjust the flanges to new positions, the allen headed clamping bolts 23 are loosened and jack bolts 41 are inserted into and turned in threaded holes 16 and thus forced against flange 19 of hub 17 causing the hub and bushing 10 to be moved away from each other. This loosening operation will relax the grip of flange units 25 and 26 about hub 17 and thus render the flanges readily adjustable.

The use of flanges 13 and 19 on bushing 10 and hub 17 respectively avoids the necessity of the clamping bolts 23 going into the body of the bushing as is required in other types of adjustable diameter sheaves. This novel feature of my invention allows the use of a very thin wall on both the bushing 10 and hub 17, thus permitting a maximum bore for a given hub outside diameter and at the same time providing a through bore construction so that the shaft can go all the way through the sheave when required.

While this invention has been described above in considerable detail, it will be apparent to those skilled in the art that various changes and modifications may be resorted to without departing from the spirit or scope of the invention as defined in the following claims.

Having thus described my invention, I claim:

1. In an adjustable diameter sheave, an exteriorly tapered split bushing; and interiorly tapered split hub positioned telescopically around said split bushing; said bushing and hub each having a flange formed on the same corresponding ends thereof; a clamping means operatively connected to said flanges for drawing said flanges together; a pair of complementary sheave flanges mounted on said hub with capacity for axial movement; and an adjustment means mounted on one of said flanges formed on said split bushing and on said split hub and operatively connected to said sheave flanges for moving said sheave flanges axially.

2. The invention of claim 1 characterized further by the fact that a jack bolt is operatively connected to said flanges formed on said split bushing and said split hub to urge said flanges apart.

3. The invention of claim 1 characterized further by the fact that said adjustment means is in the form of a screw mounted for rotary movement on one of said flanges and extending through an opening in the other and is in oppositely threaded engagement with said sheave flanges.

4. In an adjustable diameter sheave, an exteriorly tapered split bushing; an interiorly tapered split hub positioned telescopically around said split bushing; each said bushing and hub having a flange formed on the same corresponding ends thereof; a clamping means operatively connected to said flanges for drawing said flanges together; and a pair of complementary sheave flange units forming a plurality of sheaves mounted on said hub with capacity for axial movement, each said flange unit comprising a plurality of similarly inclined flanges fixedly spaced apart from each other.

5. The invention of claim 4 characterized further by the fact that an adjustment screw is rotatably mounted on one of said flanges formed on said split bushing and said split hub and is in opposite threaded engagement with a sheave in each of said complementary sheave flange units.

6. The invention of claim 5 characterized further by the fact that a jack bolt is operatively connected to said flanges formed on said split bushing and said split hub to urge said flanges apart.

7. In an adjustable diameter sheave, an exteriorly tapered split bushing; an interiorly tapered split hub positioned telescopically around said split bushing; each said bushing and hub having a flange formed on the same corresponding ends thereof; a clamping means operatively connected to said flanges for drawing said flanges together; a plurality of pairs of oppositely inclined flanges positioned on said hub with capacity for axial movement; spacing means rigidly integrating similarly inclined flanges into two units, said spacing means of one unit extending through apertures in the flanges of the other unit; and an adjusting screw rotatably mounted in one of said flanges formed on said split hub and said split hub bushing, and in oppositely threaded engagement with a flange in each of said two flange units.

WILLIAM A. WILLIAMS.

References Cited in the file of this patent

UNITED STATES PATENTS

| Number | Name | Date |
|---|---|---|
| 929,762 | Hess | Aug. 3, 1909 |
| 1,116,845 | Rogers | Nov. 10, 1914 |
| 2,172,230 | Watson | Sept. 5, 1939 |
| 2,254,380 | Mitchell | Sept. 2, 1941 |
| 2,289,965 | Herman | July 14, 1942 |
| 2,407,032 | Myers | Sept. 3, 1946 |

FOREIGN PATENTS

| Number | Country | Date |
|---|---|---|
| 512,568 | Great Britain | Sept. 20, 1939 |